United States Patent [19]
Bayer et al.

[11] Patent Number: 5,578,745
[45] Date of Patent: Nov. 26, 1996

[54] CALIBRATION STANDARDS FOR PROFILOMETERS AND METHODS OF PRODUCING THEM

[75] Inventors: Thomas Bayer, Aidlingen-Dachtel; Johann Greschner, Pliezhausen, both of Germany; Yves Martin, Ossining, N.Y.; Klaus Meissner, Herrenberg; Helga Weiss, Boblingen, both of Germany

[73] Assignee: International Business Machines Corporation, Armonk, N.Y.

[21] Appl. No.: 419,295

[22] Filed: Apr. 10, 1995

[30] Foreign Application Priority Data

Apr. 11, 1994 [EP] European Pat. Off. .............. 94105568

[51] Int. Cl.$^6$ .................................................. H01L 21/20
[52] U.S. Cl. ................................................ 73/1 J; 73/105
[58] Field of Search ........................ 73/1 J, 105; 250/306, 250/307; 156/647.1, 653.1, 662.1

[56] References Cited

U.S. PATENT DOCUMENTS

| | | |
|---|---|---|
| 4,405,405 | 9/1983 | Fujii et al. . |
| 4,623,427 | 11/1986 | Ackley et al. .......................... 156/647.1 |
| 4,626,613 | 12/1986 | Wenham et al. ....................... 156/647.1 |
| 4,916,503 | 4/1990 | Uematsu et al. . |
| 5,080,725 | 1/1992 | Green et al. ........................... 156/662.1 |
| 5,283,442 | 2/1994 | Martin et al. . |
| 5,347,854 | 9/1994 | Martin et al. . |

OTHER PUBLICATIONS

"Film Thickness and Refractive Index Standard Reference Material Calibrated by Ellipsometry and Proflometry" by G. A. Candela et al. SPIE, vol. 661, Optical Testing and Metrology (1986) pp. 402–407.

"Dimentional Metrology with Scanning Probe Microscopes" by Joseph E. Griffith et al. Journal of Applied Phys., 1 Nov. 1993, pp. 83–109.

"Method for Imaging Sidewalls by Atomic Force Microscopy" by Y. Martin et al. Appl. Phys. Lett. 64(19), May, 9, 1995, pp. 2498–2500.

Hagen et al., "Specification and Measurement of Surface Finish", Dec. 1953, GML, pp. 35–38.

*Primary Examiner*—Robert Raevis
*Attorney, Agent, or Firm*—Stephen S. Strunck

[57] ABSTRACT

Adjacent shaped grooves are placed in single crystal structure with great accuracy and known dimensions by a combination of anisotropic and isotropic etching to produce a scanning probe microscope calibration standard with fine V-shaped grooves forming a prismatically shaped ridge or blade between them. A probe microscope to be calibrated is used to profile the tip of the ridge in a number of places along the length of the ridge. With knowledge of the sidewall angles and tip radius of the calibration standard both the flat tip dimensions of a probe with a flared tip and the tip radius of a probe with a conical tip can be calculated from the profile they produce.

11 Claims, 7 Drawing Sheets

5,578,745

CALIBRATION STANDARDS FOR PROFILOMETERS AND METHODS OF PRODUCING THEM

FIELD OF THE INVENTION

The present invention relates to: calibration standards for profilometers, especially for scanning force microscopes (SFM) and for atomic force microscopes (AFM); methods of producing said calibration standards; and methods for measuring features in the sub-nanometer range or calibrating profilometers with said calibration standards.

BACKGROUND OF THE INVENTION

Probe microscopy such as scanning force microscopy and atomic force microscopy at the moment is expanding from use in pure qualitative analysis to making quantitative measurements.

How faithfully a scanning probe microscope shows the surface topography depends strongly on the size and shape of the ultrafine probe tip.

To allow the quantitative interpretation of the measuring results the probe tips used for measuring themselves have to be accurately measured before and after use in measuring, since the shape of the probe tips may change during the measuring procedure. If cone-shaped tips are used the tip diameter and the cone angle have to be accurately known. If flared or 2D tips are used the orthogonally oriented dimensions of the flat end of the probe must be accurately assessed.

In SPIE Vol.661 (1986), "Film Thickness and Refractive Index Standard Reference Material Calibrated by Ellipsometry and Profilometry" G. A. Candela et al. describe a standard reference material (SRM) consisting of a silicon wafer with a silicon dioxide film of uniform thickness. The silicon dioxide film contains windows used for stylus profilometry measurements with a mechanical depth very nearly the same as the oxide thickness. The depth, however, not being exactly the same as the oxide thickness due to native oxide forming in the windows affects the accuracy of the measurement.

In J.Appl.Phys. 74 (9), 1 Nov. 1993, "Dimensional Metrology with Scanning Probe Microscopes" J. E. Griffith and D. A. Grigg used an array of pillars with undercut sidewalls for probe characterization.

They found out that unfortunately the shape of the probe may change during a scan and that it is important to check the probe often. Frequently removing the probe for inspection, e.g. in a scanning electron microscope (SEM), however is impractical, especially if the scanning is performed in a controlled ambient or under vacuum. In most SEM inspection cycles the probe will be additionally contaminated and therefore its dimensions will be changed inherently.

The undercut of their probe characterizer serves two purposes: first it produces a cusp at the upper edge where the proximal point will hang as the probe scans over it and in addition the wall of the pillar is kept away from the probe, so that attractive forces between the probe and sidewall are kept to a minimum. To measure the total width of the probe and tip radius, the width of the pillar or hole scanned must be determined by other means.

As a result of their characterization efforts they state that calibration of a probe for use in steep topography requires a standard reference with steep topography and that in fabricating reference standards for optical linewidth measurements the uncertainty is determined by the roughness of the line edges.

To satisfy the gauge maker's rule which holds that measurements must be made to within 10% of the smallest dimension encountered they presume that calibration artifacts will have to be controlled at the atomic level. To carry that calibration over to the test structure it may be necessary to measure the probe dimensions at the atomic level too.

In their conclusion they point out that the biggest challenges in probe metrology are in the probe-sample interaction and in calibration, since in their opinion fabricating reference standards for calibration purposes poses some difficulties.

In "TopoMetrix, TI Standardizing AFM for Semiconductor Metrology", 38/Semiconductor International, October 1993, it is to be read that currently there are no industry-accepted standards for the calibration of AFM in applications such as Z-height measurement. According to this short article this limits the use of AFM for in-process metrology in lithography applications.

It is therefore an object of the present invention to provide calibration standards of high accuracy.

It is a further object of this invention is to measure probe dimensions and shape with great accuracy and to check scan linearity and accuracy.

It is an additional object of the invention to provide a method of fabricating the calibration standard.

SUMMARY OF THE INVENTION

Adjacent shaped grooves are placed in single crystal structure with great accuracy and known dimensions by a combination of anisotropic and isotropic etching to produce a scanning probe microscope calibration standard with fine V-shaped grooves forming a prismatically shaped ridge or blade between them. A microscope probe to be calibrated is used to profile the tip of the ridge in a number of places along the length of the ridge. With knowledge of the sidewall angles and tip radius of the calibration standard both the tip dimensions of a probe with a flared tip and the tip radius of a probe with a conical tip can be calculated from the profile they produce.

BRIEF DESCRIPTION OF THE DRAWINGS

These and other objects of the invention will be more clearly apparent from the following detailed description when read with reference to the accompanying drawings of which.

DETAILED DESCRIPTION

Figure 1A:
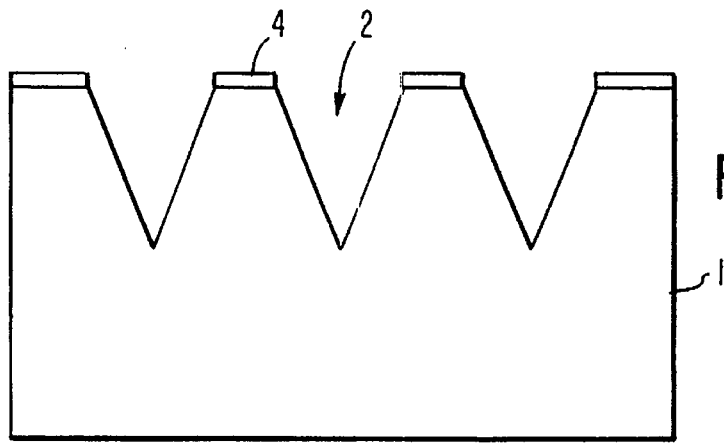
FIGS. 1a), b) and c) show a calibration standard according to this invention and the process steps to produce this standard.
Figure 1B:
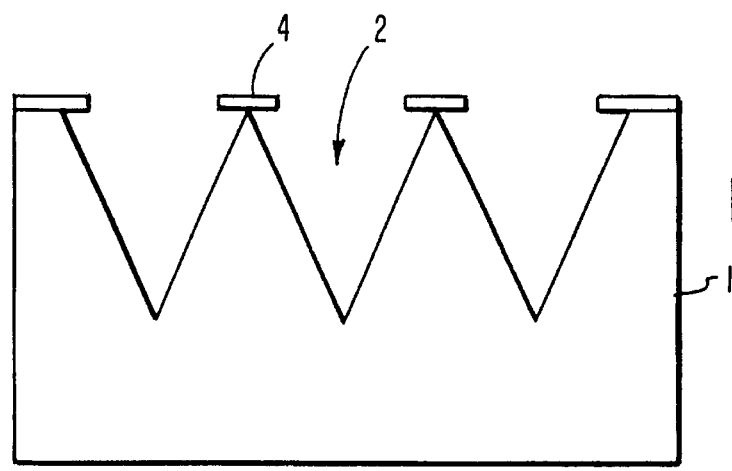
Figure 1C:
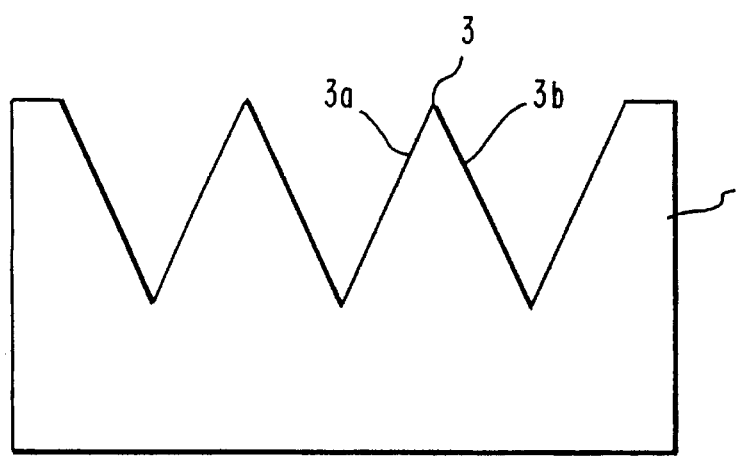

The process sequence for manufacturing the calibration standard of FIG. 1c starts in FIG. 1a where a supporting structure 1 of single crystal material, preferably a wafer of silicon, has been provided. Most preferably, this silicon wafer is a wafer with (100)-orientation.

A masking layer 4, typically comprising SiO2 or Si3N4, is deposited on the surface of the supporting structure 1, followed by the deposition of a photoresist layer. The photoresist layer and the masking layer 4 are structured using known lithography steps in a way that the remaining portion of the masking layer 4 forms stripes on the silicon wafer, said stripes being oriented in the (110)-direction.

Using the structured masking layer 4 as a mask, grooves 2 are etched into the silicon wafer by anisotropically etching it. The etched grooves 2 are V-shaped all showing a constant sidewall angle of 54.7 degrees and a high sidewall quality.

In FIG. 1b the sidewalls of the grooves 2 are shrunk by applying suitable isotropic etching or a thermal oxidation followed by a highly selective removal of the oxide which also may be done by etching. The isotropic etching or thermal oxidation of the silicon material of the supporting structure 1 consumes a special amount of silicon and thus the (111)-oriented sidewalls of neighbored grooves start approaching each other.

Shrinking of the sidewalls continues until the facing sidewalls 3a, 3b of the grooves 2 form a sharp blade 3.

With this process sequence the sharpness of the blades 3 may easily be controlled. Slight changes in the endpoint of the shrinking process do not affect the sharpness of the blades, they only result in the blades not being of the same height.

Then the mask layer 4 is removed, in the case that the oxidation/etching alternative has been carried out together with the oxide, and FIG. 1c) shows the calibration standard with extremely sharp blades 3 of about 10 nm in lateral diameter. Depending on the quality of the single crystal material used for the supporting structure the V-grooves are extremely parallel, at least for several tens of micrometer.

This process sequence allows the reproducible production of the blades having a diameter of a few nanometers.

The blades should have a length of several tens of micrometer to allow several calibration measurements at different locations. With these multiple measurements random faults caused as e.g. by particles may be eliminated.

Figure 10:
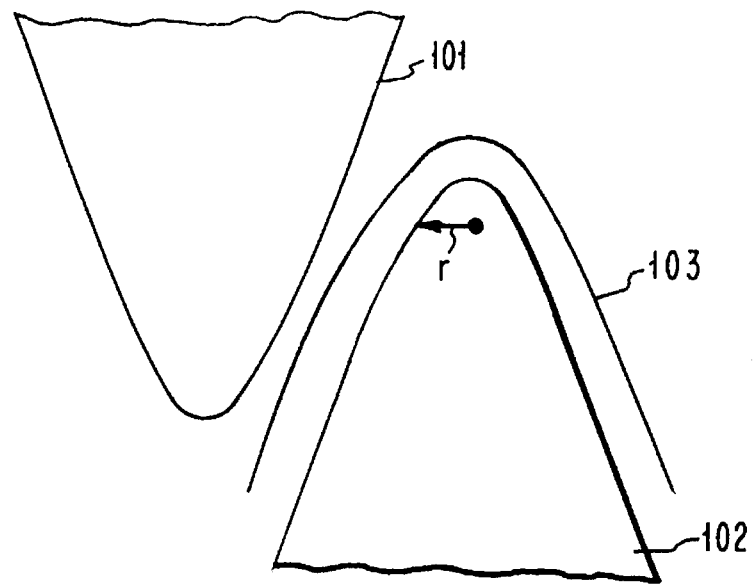
FIG. 10 shows tip radius measurement of a cone shaped tip using the calibration standard of FIG. 1c.

Referring to FIG. 10, a conically shaped probe 101 is placed in close proximity to the V-shaped calibration standard 102 with a tip radius r and moved across the tip of the calibration standard to produce the profile of the probe with the tip of the standard. The track of the profile is measured from the center of the probe tip by the scanning probe microscope. Subtraction of the tip radius r of the V-shaped groove from the radius of the profile 103 produced by the scanning probe microscope gives the radius of the tip of scanning probe.

Figure 11:
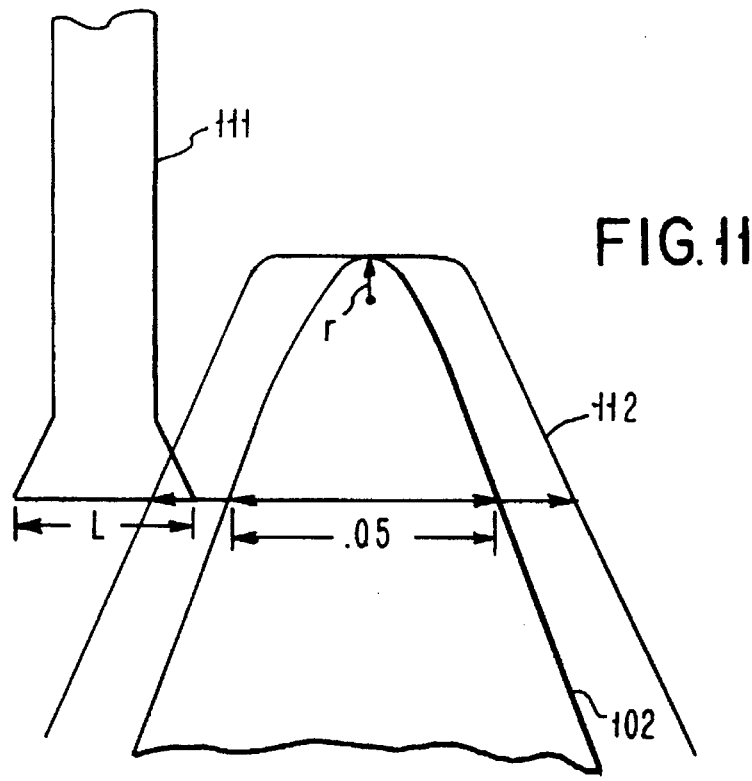
FIG. 11 shows tip width measurements of a flared tip probe using the calibration standard of FIG. 1c.

Referring to FIG. 11, a flared or 2D tip 111 such as the one described in U. S. Pat. No. 5,283,442 entitled "Surface profiling Using Scanning Force Microscopy" (which patent is incorporated herein by reference) is placed in contact with the V-shaped calibration standard 102 and moved across the ridge of the groove to produce the flat topped profile with the probe center. Subtraction of the width of the V-shaped probe from the profile at some point removed from the ridge of the calibration standard say at the point where V-shaped standard is 0.05 micrometers provides an accurate measure of length of the flat portion of the flared tip. The flared tip must then be used to profile the standard at right angles to the first profile to obtain both dimensions of it's flat top. As pointed out above a number of profiles are made at different points along the ridge to account for random faults of the standard.

Figure 8:
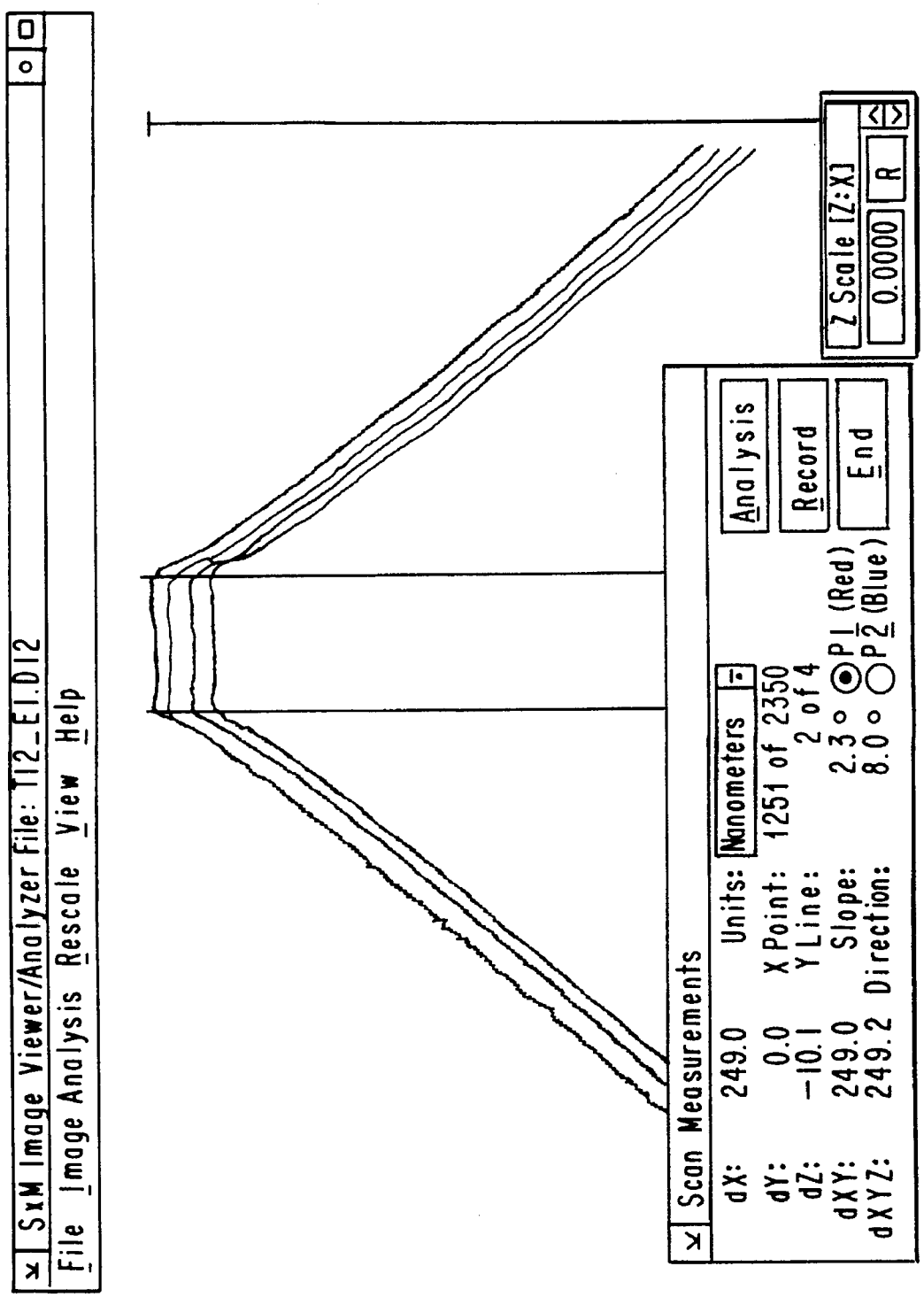
FIG. 8 gives the line scan results obtained when using a calibration standard according to FIG. 1c.

FIG. 8 gives the line scan results obtained for a 2D tip when using a calibration standard according to FIG.1c). The lateral diameter of the blade 3 may be defined with a SEM or TEM with an absolute accuracy of at least +/–5%, which causes an inaccuracy of about +/–0.5 nm when the blade itself has a lateral dimension of about 10 nm. This example shows how important it is to provide ultrasharp blades, since calibration structures with about 1 micrometer dimensions could not be measured with the same accuracy, the example given offers only +/–50 nm accuracy.

As pointed out above after profiling the sharp blade 3 with a tip 5 with e.g. an atomic force microscope or a tunneling force microscope, the known lateral dimension of the blade has to be subtracted from the measured value to obtain the diameter of the tip 5. These blades may be used for defining cone shaped tips as well as tips with flared apex used in the 2D atomic force microscopy.

The groove structure is also suitable for the calibration of the x scan motion and for the linearity of that motion.

Figure 2:
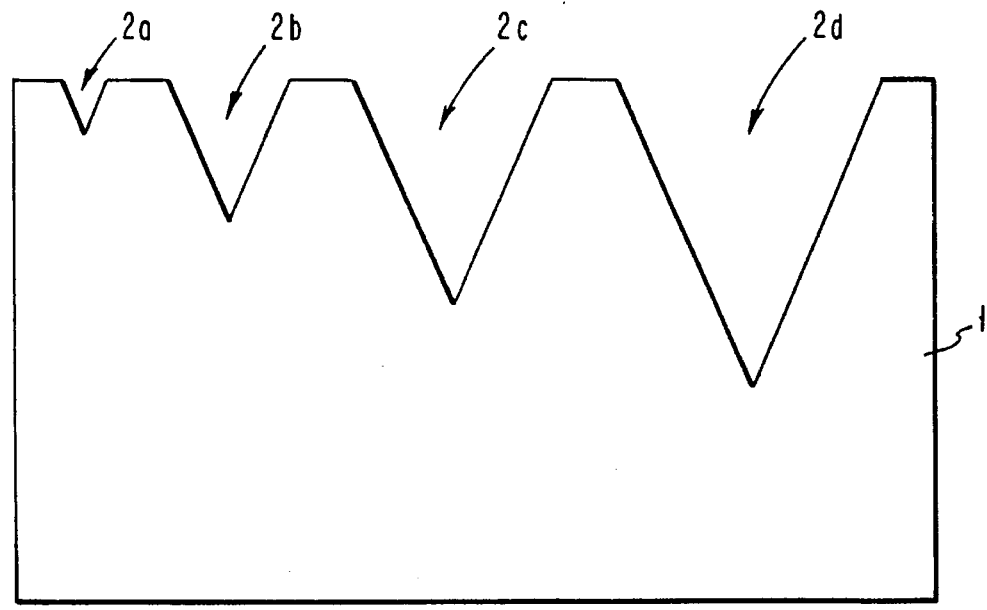
FIG. 2 shows another embodiment of the present invention.

Another preferred embodiment is shown in FIG. 2. In the supporting structure 1 there is an array of V-shaped grooves 2a, 2b, 2c, 2d of different sizes. The manufacturing process is similar to that described in FIGS. 1a–1c. The width W of a groove is defined lithographically with W ranging from about 10 nm to a few hundred micrometers. The maximum width is only limited by the thickness of the supporting structure 1, preferably a silicon wafer.

Figure 5:
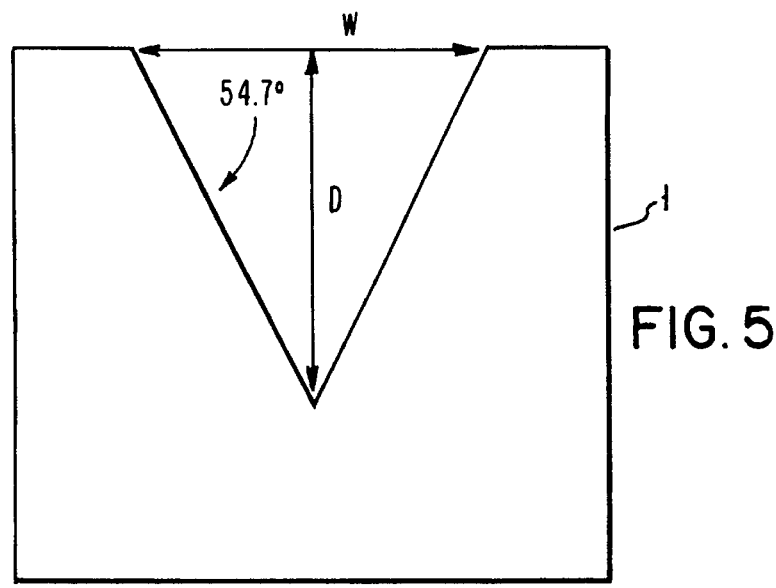
FIG. 5 shows the depth D and width W measurements of the grooves in FIGS. 1 and 2.

The relation between width W and depth D of a groove is shown in FIG. 5. By anisotropically etching a silicon wafer with an (100)-orientation (111)-grooves with respect to the (100)-plane and with a constant sidewall angle of 54.7 degrees are provided. The depth D to width W ratio for single crystal silicon is contact is defined by:

$$D = 0.706\ W$$

Figure 7:
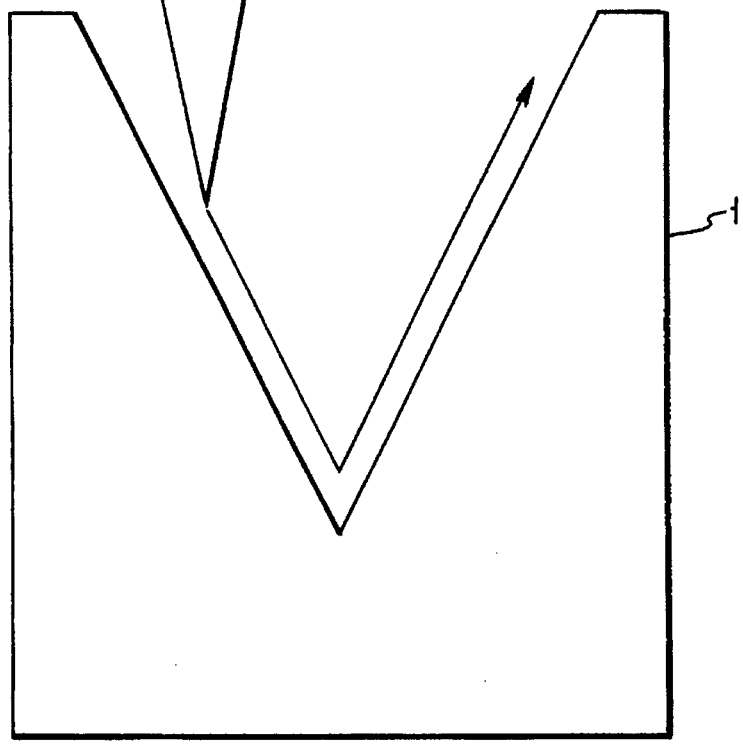

Scanning this calibration standard with an ultrafine profilometer tip 5 as shown in FIG. 7 measures the different Wi and Di values of the i grooves 2a, 2b, 2c, 2d with each Di =0.706 Wi. Without the need of changing the calibration standard these measurements allow to define the Z-linearity of a profilometer with the highest accuracy in a very simple manner.

The calibration standard as described in FIG. 2 may also be used for calibrating the Z amplitude. This is only possible with the lateral X amplitude being already defined by another method and with an ultrafine tip 5 showing a smaller cone angle and radius of curvature than the calibration standard itself. There already exist tips with these properties.

Figure 3A:
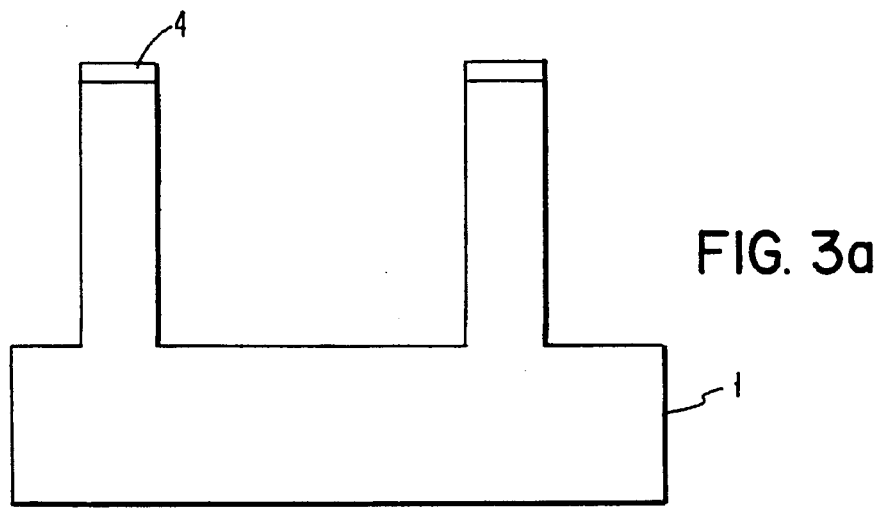
FIGS. 3a) and b) and FIGS. 4a), b), c) and d) show other embodiments of this invention and the steps of their respective fabrication processes.
Figure 3B:
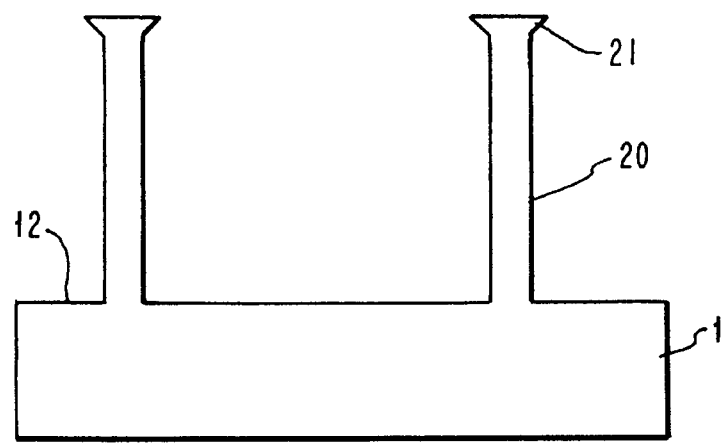

The embodiment of FIG. 3b offers another possibility for precise determination of probe tip cone angles and tip curvature. Starting from similar conditions as described above in FIG. 1a, instead of grooves a pillar or ridge structure 20 is etched into the supporting structure 1. The etching step may be an anisotrope dry or wet etch step. The axis of the pillar or ridge structure 20 is orthogonal to the surface 12 of the supporting structure 1 and the dimensions of the structure 20 are in the micrometer range, a typical height being about 1 micrometer. The distance between the orthogonal pillars 20 should be wide enough to allow an ultrafine tip to profile neighbored pillars.

By shrinking the sidewalls of the structure 20 of FIG. 3a, as described in FIG. 1b horizontal blades 21 are formed on the top surface of the pillars or ridges. Removal of the masking layer 4 provides the calibration standard of FIG. 3b.

Figure 6:
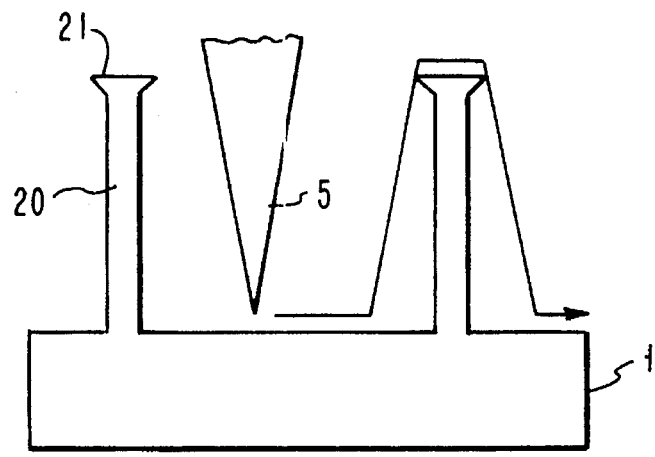
FIG. 6 and FIG. 7 show tips scanning over calibration samples.

FIG. 6 shows the determination of a tip cone angle with the calibration standard of FIG. 3b. With an ultrafine tip 5 the horizontal blades 21 of the pillar or ridge structure 20 are profiled and the horizontal portions of the blades 21 are subtracted from the measured line scan value. The result of this subtraction step represents the cone angle of the used ultrafine tip 5.

To define the curvature of the ultrafine tip 5 first the curvature of the blades 21 has to be provided by SEM or TEM measurement and then the line scan value as obtained above has to be defolded.

Figure 4A:
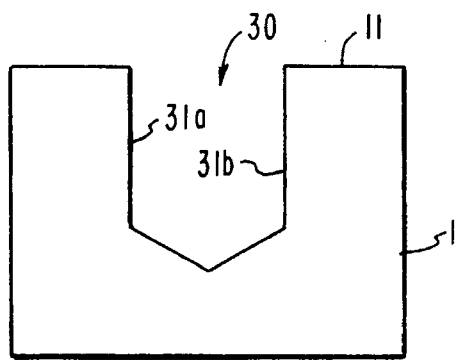
Figure 4B:
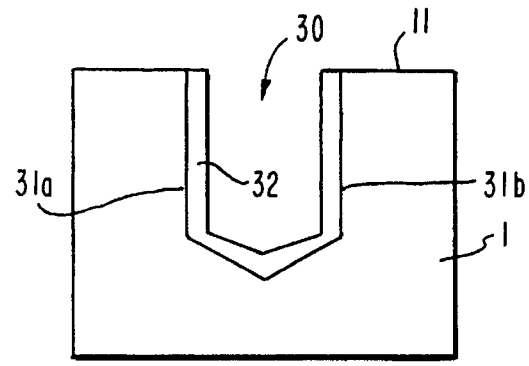
Figure 4C:
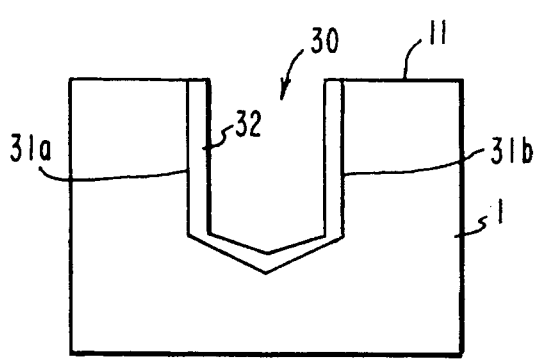
Figure 4D:
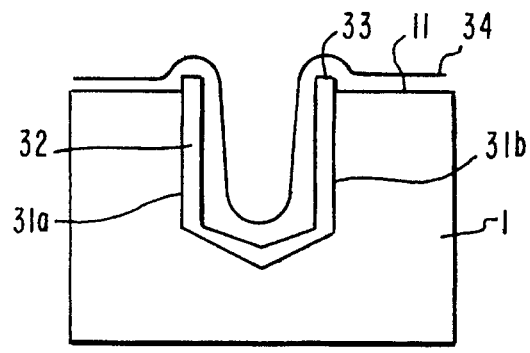

FIG. 4d offers another calibration standard especially for the precise characterization of tip radius and cone angle of cone shaped tips used in scanning force microscopy. This calibration standard is manufactured according to the process steps shown in FIGS. 4a to 4d.

Starting from similar conditions as described above in FIG. 1a, instead of producing grooves, trench structures 30 with sidewalls 31a, 31b orthogonal to the surface 11 of the supporting structure are etched into the supporting structure 1, which is to be seen in FIG. 4a. The widths of the trenches 30 depend on the tips to be characterized, they typically are in the range of about 0.1 μm to about 10 μm.

The etch depth also depends on the tips to be characterized and typically varies from about 0.5 μm to about 10 μm.

In FIG. 4b a layer 32 is deposited on the sidewalls of the trench structure 30 and the surface of the supporting structure with a thickness of about 20 nm.

A suitable deposition process is a chemical vapor deposition or a plasma enhanced chemical vapor deposition step, the layer material typically comprising SiO2, Si3N4, SiC or diamondlike C. Another possibility is a thermal oxidation step with the grown thermal oxide offering several advantages with regard to the uniformity and the conformity of the layer 32 to be grown, as can easily be seen in FIG. 4b. The oxidation step provides a layer of equal thickness on both the horizontal and the vertical sidewalls 31a, 31b of the trench 30. This is extremely important since an optical transparent layer 32 as e.g. of SiO2 may be measured with accuracies better than 1 nm on horizontal planes. Transferring the measured horizontal value to the layer thickness of the sidewalls affords high conformal deposition processes.

In FIG. 4c the part of the layer 32 covering the surface of the supporting structure 1 is removed without affecting the parts of the layer 32 covering the sidewalls of the trench structure 30. The removing step could preferably be done by mechanical or mechanical and chemical polishing.

To arrive at the calibration structure of FIG. 4d, the surface 11 of the supporting structure 1 is selectively etched back without affecting the remaining portions of layer 32 until the remaining portion of layer 32 on the sidewalls 31a, 31b extends beyond the surface 11 of the supporting structure 1 and forms a raised line 33.

The mechanical stability of the layer 32 material by way of example would allow a raised line of about 50 nm with a layer thickness of about 20 nm to be provided. In this special example the surface 11 of the supporting structure 1 thus would have to be etched back about 50 nm.

The resulting structure may be used in a calibration standard with the same calibration standard having raised lines of different line widths and heights to allow the calibration of different tips without changing the standard.

The line 34 shows the profile produced by a scan with a conical tip. The portions of the profile produced by the sidewalls of the trench give the angle of the cone and the curvature of the profile caused by the extension give the radius of curvature of the tip.

The manufacturing steps described in connection with the calibration standards of FIGS. 1, 2, 3 and 4 are all known microfabrication processes which allow a reproducible and cost effective production of the calibration standards.

Figure 9:
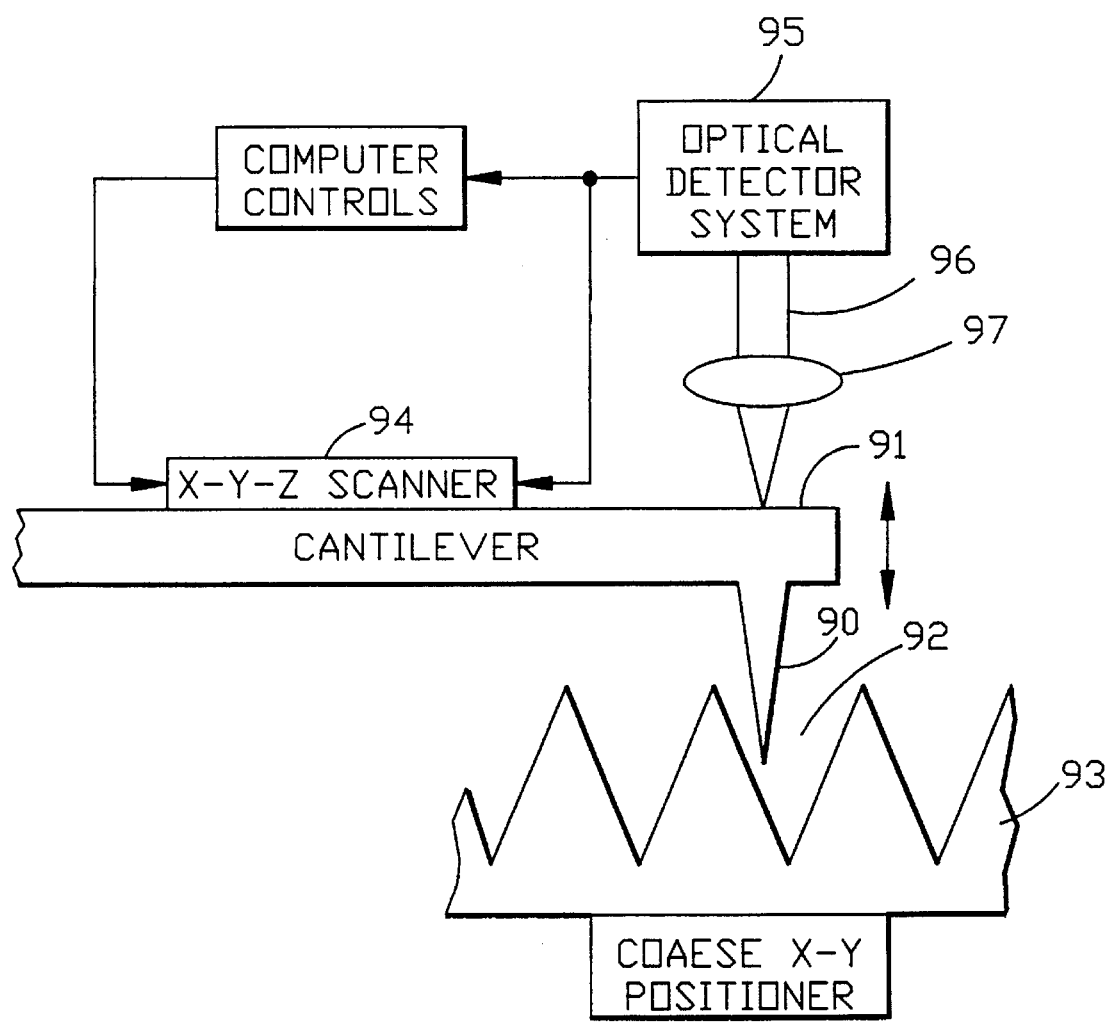
FIG. 9 shows calibration standards in accordance with the present invention being used with a scanning probe microscope to calibrate the microscopes tip.

Referring now to FIG. 9 a conical tip 90 coupled to a cantilever arm 91 of an atomic force microscope, is shown disposed in a V-shaped groove 92 in a calibration standard 93. The tip 90 is moved in the scan direction along the X axis. The tip is moved on the arm 91 by a 3 axis driver 94 under computer control so that the tip faithfully follows the surface topology of the standard in close proximity thereto.

Detection means 95 employs a laser beam 96 passed through a collimating lens 97 to detect movement of the cantilever arm for measurement of tip motion. The details of the microscope do not constitute part of the invention and therefore are not described herein. Scanning probe microscopes are well known in the art. A more detailed description of such a microscope can be found in U. S. Pat. 5,347,854 entitled "Two Dimensional Profiling a Contact Force Atomic Force Microscope" which patent is herein incorporated by reference.

While a number of embodiments of our invention have been described herein above, it will be apparent to those skilled in the art that modifications of the described embodiments can be made without departing from the spirit and scope of the invention which is limited only by the scope of the claims appended hereto.

Having thus described our invention what we claim as new and desire to secure as Letters Patent, is:

1. In combination with a scanning probe microscope an improved calibration standard for performing measurements on a scanning probe installed in the scanning probe microscope comprising:

a supporting structure of single crystal material having a surface with either a 100 or 110 orientation with at least two V-shaped grooves, said grooves with sidewalls having a 111 orientation, said grooves being located in closed relationship to each other in a way that their adjacent sidewalls form a sharp blade means for profiling with the scanning probe using the scanning probe microscope, said sharp blade means having a known tip radius and angle between its sidewalls for use in calculating the shape and dimensions of the scanning probe.

2. The calibration standard of claim 1 wherein:

aid grooves all have the same width to depth ratio.

3. The calibration standard of claim 1 wherein said at least two V-shaped grooves comprise an array of sets of V-shaped grooves of different sizes.

4. A method of producing a calibration standard comprising the steps:

a) providing a supporting structure of single crystal material with a surface with either a 100 or 110 orientation;

b) structuring on said surface a masking layer with spaced apertures;

c) anisotropically etching V-shaped grooves into said supporting structure using said masking layer as an etch mask;

d) shrinking the sidewalls of said grooves until their facing sidewalls form a sharp blade and e) removing the structured masking layer.

5. The method of claim 4 wherein said shrinking step d) includes etching said sidewalls.

6. The method of claim 5 wherein said shrinking step d) includes oxidizing said sidewalls prior to said etching of said sidewalls.

7. In calibration standards used with scanning probe microscopes, an improved calibration structure comprising:

a single crystal material having a surface with either a 100 or 110 orientation with at least two grooves ansiotropically etched therein to form, between adjacent walls of the two grooves, an unstanding calibration structure, said adjacent walls converging toward each other so that the upstanding calibration structure is a sharp blade means for profiling by a tip in a scanning probe microscope during calibration of the scanning probe microscope, said blade means having a known tip radius and a known angle between its sidewalls for use in calculating the dimensions and shape of the tip from said profiling by the tip.

8. The calibration standard of claim 7 wherein:

said grooves have the same width to depth ratio.

9. The calibration standard of claim 8 wherein said at least two grooves comprise an array of sets of grooves of different sizes for use in calibration in a z direction during calibration.

10. The calibration standard of claim 8 wherein said sidewalls have a 111 orientation.

11. The calibration standard of claim 10 wherein said blade means has a lateral dimension of not more than 10 nanometers.

* * * * *